US011441526B1

(12) United States Patent
Sharma et al.

(10) Patent No.: US 11,441,526 B1
(45) Date of Patent: Sep. 13, 2022

(54) ENGINE CRANK SYSTEM AND METHOD

(71) Applicant: GM GLOBAL TECHNOLOGY OPERATIONS LLC, Detroit, MI (US)

(72) Inventors: Pranjal Sharma, Troy, MI (US); Chandra S. Namuduri, Troy, MI (US); Suresh Gopalakrishnan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/397,026

(22) Filed: Aug. 9, 2021

(51) Int. Cl.
*F02N 11/00* (2006.01)
*F02N 11/08* (2006.01)
*F02B 67/06* (2006.01)
*F02N 11/04* (2006.01)

(52) U.S. Cl.
CPC ............ *F02N 11/006* (2013.01); *F02B 67/06* (2013.01); *F02N 11/04* (2013.01); *F02N 11/0851* (2013.01)

(58) Field of Classification Search
CPC .... F02N 11/006; F02N 11/04; F02N 11/0851; F02B 67/06
See application file for complete search history.

(56) References Cited

U.S. PATENT DOCUMENTS

| | | | | |
|---|---|---|---|---|
| 7,367,416 | B2* | 5/2008 | Seufert | B60K 6/547 477/8 |
| 8,447,451 | B2* | 5/2013 | Kim | B60K 6/448 180/65.265 |
| 8,738,205 | B2* | 5/2014 | Steuernagel | B60W 20/40 701/22 |
| 8,758,192 | B2* | 6/2014 | Smith | B60K 6/442 180/65.285 |
| 8,894,540 | B2* | 11/2014 | Hashemi | F02N 11/0844 477/115 |
| 9,086,045 | B2* | 7/2015 | Wang | B60W 20/40 |
| 9,096,135 | B1* | 8/2015 | Simonini | B60L 53/32 |
| 9,322,378 | B2* | 4/2016 | Lovett | F02N 11/0803 |
| 10,023,177 | B2* | 7/2018 | Makled | F02N 11/006 |
| 2013/0231817 | A1* | 9/2013 | Werner | B60W 20/40 903/903 |
| 2014/0067183 | A1* | 3/2014 | Sisk | B60L 7/18 701/22 |
| 2015/0112523 | A1* | 4/2015 | Wang | B60W 20/40 180/65.265 |
| 2017/0259808 | A1* | 9/2017 | Makled | B60W 10/02 |

* cited by examiner

Primary Examiner — Joseph J Dallo
(74) Attorney, Agent, or Firm — Cantor Colburn LLP

(57) ABSTRACT

Internal combustion engine cranking is carried out including with a limited overlapping of cranking with a starter motor and a starter/generator during at least the initial compression stroke during a cranking cycle.

20 Claims, 3 Drawing Sheets

ENGINE CRANK SYSTEM AND METHOD

INTRODUCTION

The subject disclosure relates to internal combustion engine starting systems.

Internal combustion engines may be started by spinning the engine crankshaft while providing a fuel charge to the cylinders. The fuel charge may be ignited by spark or compression depending upon the type of engine involved. Large displacement engines and higher compression engines require large spinning forces during engine start.

One known engine starting system includes a starter motor selectively engaging an engine flywheel ring gear through a pinion gear. With a starter motor, crankshaft torque is high at low speed primarily due to the high ring to pinion gear ratio but declines steeply as the speed increases. Another known engine starting system includes a starter/generator unit (SGU) coupled to the engine crankshaft via a belt and pulley arrangement. With a SGU, crankshaft torque is lower at low speed due to low belt drive ratios but may provide relatively higher torque at higher engine speeds. Successful starting requires maintaining engine speed during the cranking cycle sufficient to reliably start the engine, avoid stalling and avoid large speed deviations resulting in objectionable noise, vibration and harshness (NVH) performance. Some vehicles may be configured with a starter motor system used for cold starts of the engine and a SGU used for engine restarts in stop/start situations such as while stopped at traffic signals.

SUMMARY

In one exemplary embodiment, a cranking system for an internal combustion engine may have a first electric machine rotatably coupled to a crankshaft of the engine, a second electric machine rotatably coupled to the crankshaft of the engine, and a controller executing an engine cranking cycle including causing the first electric machine to crank the engine beginning from a stopped engine state and ending at a crankshaft angle substantially corresponding to a top dead center combustion position of a first piston undergoing a first compression stroke, and causing the second electric machine to crank the engine beginning at a crankshaft angle subsequent to a bottom dead center intake position of the first piston undergoing the first compression stroke.

In addition to one or more of the features described herein, the first electric machine may be selectively rotatably coupled to the crankshaft of the engine.

In addition to one or more of the features described herein, the first electric machine may include a starter motor unit.

In addition to one or more of the features described herein, the second electric machine may include a starter/generator unit.

In addition to one or more of the features described herein, the first electric machine may be rotatably coupled to the crankshaft of the engine through a pinion gear of the first electric machine meshing with a ring gear coupled to a flywheel coupled to the crankshaft.

In addition to one or more of the features described herein, the second electric machine may be rotatably coupled to the crankshaft of the engine through a belt drive arrangement including a first pulley coupled to the second electric machine, a second pulley coupled to the crankshaft, and a belt coupled between the first pulley and the second pulley.

In addition to one or more of the features described herein, the controller executing an engine cranking cycle may further cause the first electric machine to crank the engine beginning at a crankshaft angle during at least one subsequent compression stroke and ending at a crankshaft angle substantially corresponding to the end of the at least one subsequent compression stroke.

In another exemplary embodiment, a cranking system may include an internal combustion engine having a crankshaft, a flywheel coupled to the crankshaft and a ring gear coupled to the flywheel at a perimeter thereof, a starter motor unit having a pinion gear rotatably coupled to an electric motor, the pinion gear being controllably engageable to the ring gear and the electric motor being controllably energizable to cause rotation of the pinion gear, a starter/generator unit rotatably coupled to the crankshaft, and a controller causing the pinion gear to engage with the ring gear and energizing the electric motor to crank the engine beginning from a stopped engine state and ending at a crankshaft angle substantially corresponding to a top dead center combustion position of a first piston undergoing a compression stroke, and causing the starter/generator unit to crank the engine beginning at a crankshaft angle subsequent to a bottom dead center intake position of the first piston undergoing the compression stroke.

In addition to one or more of the features described herein, causing the pinion gear to engage with the ring gear may occur while the engine is coasting down to the stopped engine state.

In addition to one or more of the features described herein, causing the pinion gear to engage with the ring gear may occur while the engine is below a predetermined crankshaft speed target.

In addition to one or more of the features described herein, the starter/generator unit may include a field coil, and the controller may cause pre-fluxing of the field coil while the electric motor is energized and prior to the starter/generator unit cranking the engine.

In addition to one or more of the features described herein, the cranking system may include a rotation sensor sensing rotation of the crankshaft, wherein the rotation sensor provides crankshaft angle information to the controller.

In addition to one or more of the features described herein, the cranking system may include a rotation sensor sensing rotation of the starter/generator unit which is synchronized to rotation of the crankshaft, wherein the rotation sensor provides crankshaft angle information to the controller.

In addition to one or more of the features described herein, the controller may cause the starter motor unit to crank the engine beginning at a crankshaft angle during at least one subsequent compression stroke and ending at a crankshaft angle substantially corresponding to the end of the at least one subsequent compression stroke.

In yet another exemplary embodiment, a method of performing an engine cranking cycle may include cranking the engine with a starter motor during an initial cranking period beginning from a stopped engine state and ending at a crankshaft angle substantially corresponding to the end of a first compression stroke of a first piston to undergo a compression stroke, and cranking the engine with a starter/generator beginning no later than at a crankshaft angle during the first compression stroke and continuing until the engine crank cycle ends.

In addition to one or more of the features described herein, cranking the engine with the starter/generator may begin from the stopped engine state.

In addition to one or more of the features described herein, cranking the engine with the starter/generator may begin during the first compression stroke.

In addition to one or more of the features described herein, the engine cranking cycle may include cranking the engine with the starter motor beginning at a crankshaft angle during at least one subsequent compression stroke and ending at a crankshaft angle substantially corresponding to the end of the at least one subsequent compression stroke.

In addition to one or more of the features described herein, the engine cranking cycle may include pre-fluxing a field coil of the starter/generator during the initial cranking period until cranking the engine with the starter/generator begins.

In addition to one or more of the features described herein, the engine cranking cycle may include engaging a pinion gear of the starter motor to a ring gear of a flywheel coupled to the crankshaft while the engine is coasting down to the stopped engine state.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
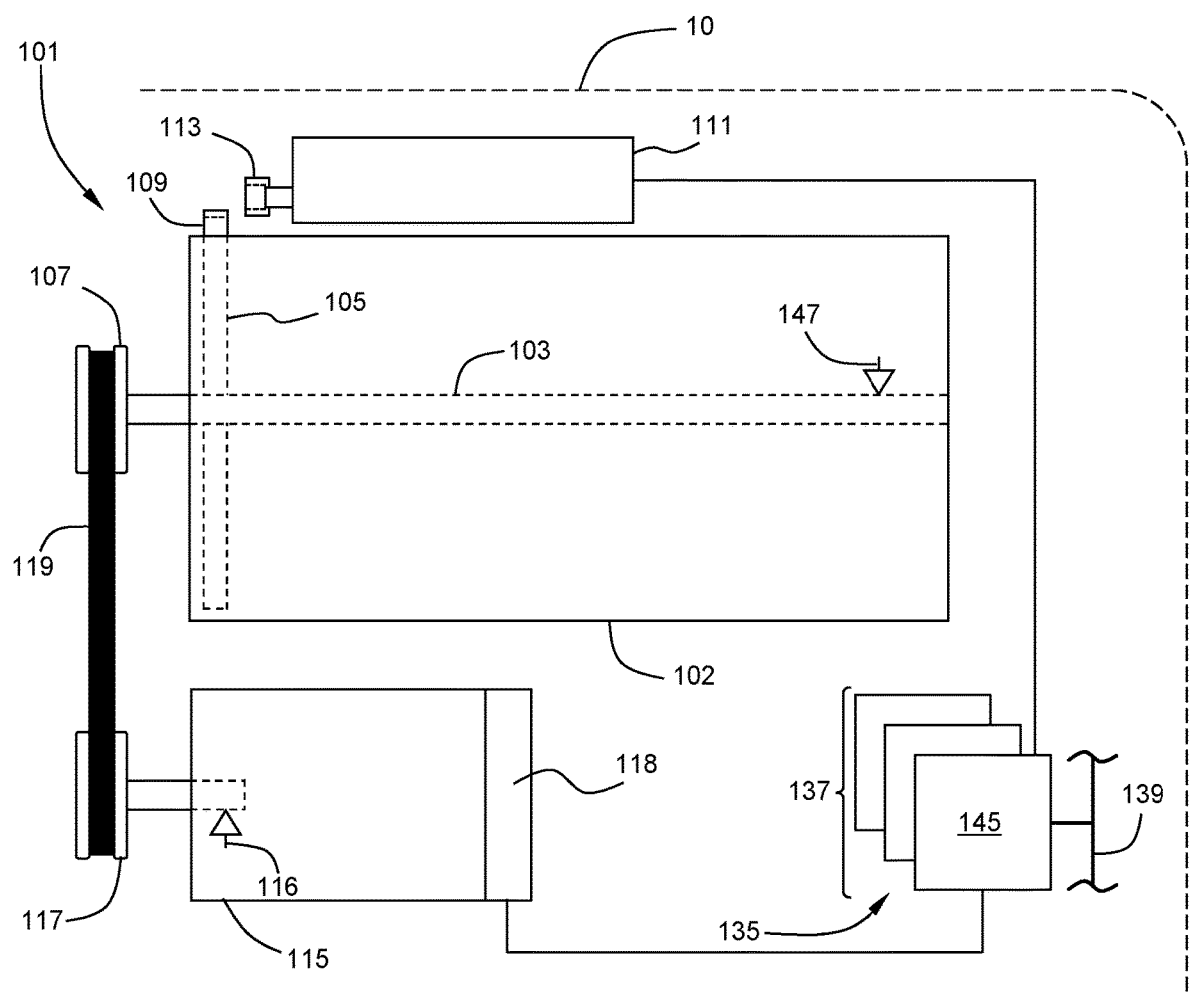
FIG. 1 schematically depicts a vehicle and internal combustion engine system, in accordance with one or more embodiments.

The following description is merely exemplary in nature and is not intended to limit the present disclosure, its application or uses. It should be understood that throughout the drawings, corresponding reference numerals indicate like or corresponding parts and features. As used herein, control module, module, control, controller, control unit, electronic control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, on vehicle controller area networks and in-plant and service-related networks. Functions of the control module as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module has a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

In accordance with one or more exemplary embodiments, methods and systems for engine cranking are described herein. More particularly, a cranking system and method is described herein that provides adequate starting torque to the engine at all engine crankshaft speeds during an engine cranking cycle.

FIG. 1 shows an embodiment of an exemplary vehicle 10. The vehicle 10 may be any automobile, truck, aircraft, construction equipment, farm equipment, factory equipment, etc. whether user or autonomously operated. Vehicle 10 includes an internal combustion engine system 101 including a multi-cylinder internal combustion engine (engine) 102. Internal combustion engine system 101 may include a control system architecture 135 including one or more electronic control units (ECU) 137 which may be communicatively coupled via a bus structure 139 to perform control functions and information sharing, including executing control routines locally and in distributed fashion. Bus structure 139 may include a Controller Area Network (CAN), as well known to those having ordinary skill in the art. One exemplary ECU may include controller 145 primarily performing functions related to internal combustion engine monitoring, control and diagnostics based upon a plurality of inputs. The inputs may be coupled directly to controller 145, or may be provided to or within controller 145 from a variety of well-known sensors, calculations, derivations, synthesis, other ECUs and over the CAN or other bus structure 139 as well understood by those having ordinary skill in the art. Engine 102 includes a crankshaft 103 rotatably coupled to a flywheel 105 and crankshaft pulley 107. An encoder or other rotation sensor 147 may provide crankshaft 103 speed and absolute position (crankshaft angle) information to controller 145. The outer perimeter of the flywheel 105 includes a ring gear 109. A starter motor unit (SMU) 111 includes a starter motor (SMU motor) rotatably coupled to a pinion gear 113 which may be controllably engaged with the ring gear 109 of the flywheel 105 for imparting rotation thereto and to the engine crankshaft 103 during engine cranking cycles. SMU 111 may include reduction gearing such as a planetary gear set coupling the SMU motor to the pinion gear 113. In one embodiment as illustrated, a starter-generator unit (SGU) 115 may be coupled to the engine crankshaft 103 via a belt drive arrangement. SGU 115 may thus include a SGU pulley 117. A belt 119 rotatably couples the SGU pulley 117 to a crankshaft pulley 107 for bi-directionally coupling torque therebetween. Alternative drive arrangements may include a chain, gear drives or fluidic torque couplers as non-limiting examples. Moreover, alternate embodiments may include an SGU integrated with the engine 102 block and directly, or through alternative torque coupling arrangements such as planetary gearing, providing coupling to the engine 102 crankshaft 103. The engine 102 crankshaft 103 may drive the SGU 115 operating as a generator or may be driven by the SGU 115 operating as a starter motor. SGU 115 may include an encoder or other rotation sensor 116 to provide SGU 115 speed and position information to controller 145. Position of SGU 115 may be synchronized to crankshaft 103 position thereby providing crankshaft 103 speed and absolute position (crankshaft angle) information from SGU 115 rotation sensor 116 information.

SMU 111 may include a controlled pull-in solenoid for engaging the pinion gear 113 to the ring gear 109. The solenoid may also engage high current contacts for energizing the SMU motor when the pinion gear 113 and ring gear 109 are engaged. Alternatively, the pinion gear 113 engagement to the ring gear 109 may be controlled separately from the SMU motor energization with the SMU motor energization being controlled by a separate high current relay or solid-state switch, for example. Therefore, SMU 111 may be responsive to control commands from controller 145 to control engagement of the pinion gear 113 to the ring gear 109 and energization of the SMU motor. SGU 115 may be controllably operated as a motor to impart torque to the crankshaft 103 or operated as a generator being driven by torque received from the crankshaft 103. SGU 115 may include any rotary electric machine controllably operable as a motor or generator, for example a multiphase AC synchronous or AC asynchronous machine. An exemplary AC synchronous machine may include a permanent magnet rotor (not separately illustrated). Another exemplary AC synchronous machine may include a field coil (not separately illustrated). Yet another exemplary AC synchronous machine may include both permanent magnets and a field coil. SGU 115 may include an inverter 118 including integrated SGU controls for rectification and inversion in accordance with the operating mode of the SGU 115. The SGU controls are responsive to control commands from controller 145 to control the field coil energization and inverter 118 operation.

Figure 2:
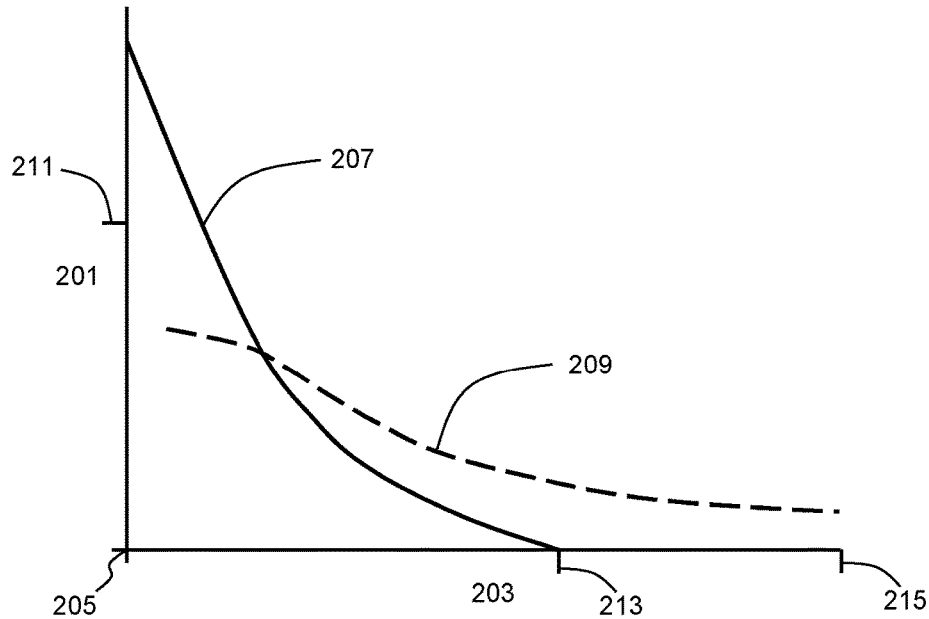
FIG. 2 illustrates a chart of general torque vs. speed characteristics of an electric machine in an exemplary internal combustion engine system, in accordance with one or more embodiments.

FIG. 2 illustrates a chart of general torque vs. speed characteristics of an SMU 111 and SGU 115 in an exemplary internal combustion engine system 101 as illustrated in FIG. 1. Torque is plotted along the vertical axis 201 and represents torque at the crankshaft 103 of engine 102. Crankshaft 103 speed is plotted along the horizontal axis 203. At the origin 205, torque and speed are zero. Torque and speed are increasingly non-zero away from the origin 205 along the respective vertical axis 201 and horizontal axis 203, respectively. SMU 111 torque is plotted as curve 207 (solid curve) and SGU torque is plotted as curve 209 (broken curve). It is appreciated that the relatively high ring gear 109 to pinion gear 113 ratio may exhibit a relatively high crankshaft torque above a minimum desired zero speed starting torque 211 which rapidly decreases to a zero torque at a SMU limit crankshaft speed 213 below a minimum desired engine idle speed 215. It is further appreciated that the relatively low belt drive ratio (i.e., SGU pulley 117 to crankshaft pulley 107) may exhibit a relatively low crankshaft torque below the minimum desired zero speed starting torque 211 which slowly decreases but remains above zero torque at the SMU limit crankshaft speed 213 and beyond through the minimum desired engine idle speed 215.

Figure 3:
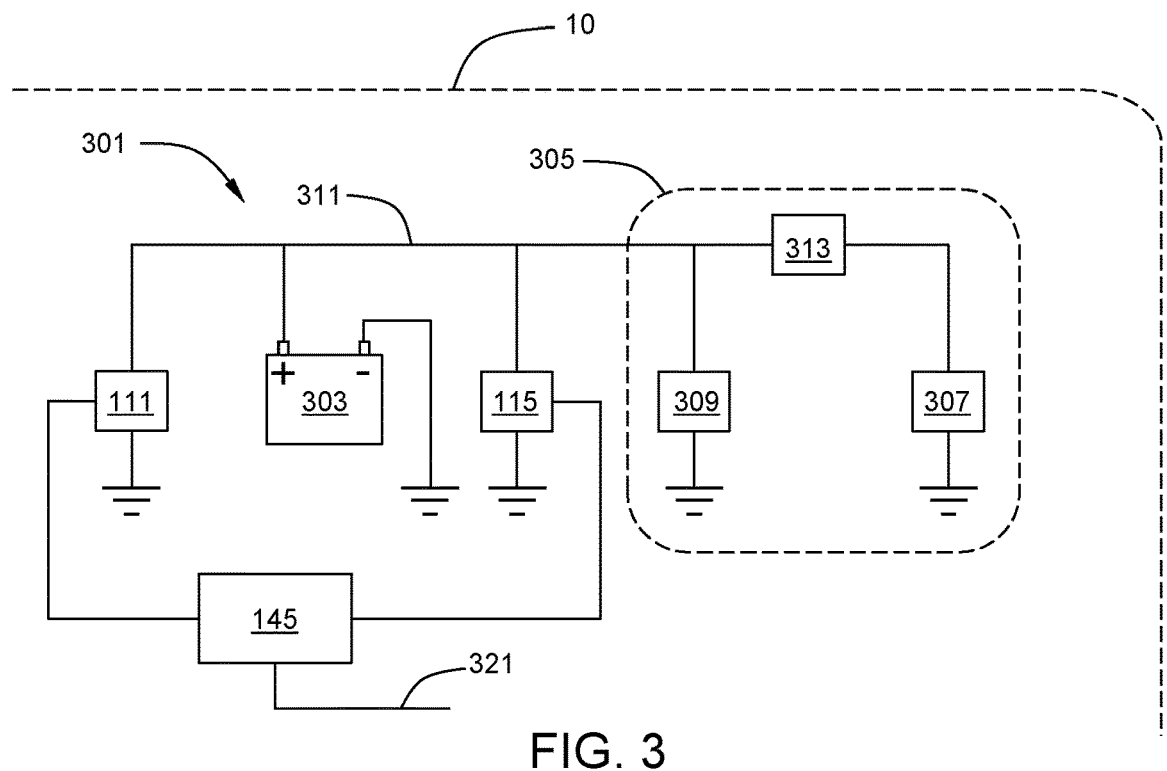
FIG. 3 schematically illustrates an electrical system of a vehicle, in accordance with one or more embodiments.

In accordance with the present disclosure, the general torque vs. speed characteristics of the SMU 111 and the SGU 115 are advantageously employed in a cranking cycle for the engine 102 of the exemplary internal combustion engine system 101. FIG. 3 schematically illustrates an embodiment of an electrical system 301 of the exemplary vehicle 10. The electrical system 301 may include a low voltage (e.g., 12 Volt) battery 303, for example a conventional lead-acid chemistry battery conventionally employed for starting, lighting and ignition (SLI) uses. The battery 303 may source electrical power for engine starting functions at the SMU 111 and the SGU 115 as well as for the vehicle's low voltage loads 305. The low voltage loads 305 may include sensitive loads 307 and non-sensitive loads 309. Non-sensitive loads 309 may be sourced directly from a low voltage rail 311, whereas sensitive loads 307 may be sourced via an intervening DC regulator and filter device such as a DC-DC converter 313. Controller 145 may provide control commands to the SMU 111 and the SGU 115 in accordance with a predetermined set of program instructions executed therein. Controller 145 may receive an engine start request 321, for example from a user interface such as a key activated ignition switch or push-to-start button. Engine start requests may also originate in response to other user interface inputs and/or vehicle controls, for example a brake switch release in an engine autostart scenario.

Figure 4:
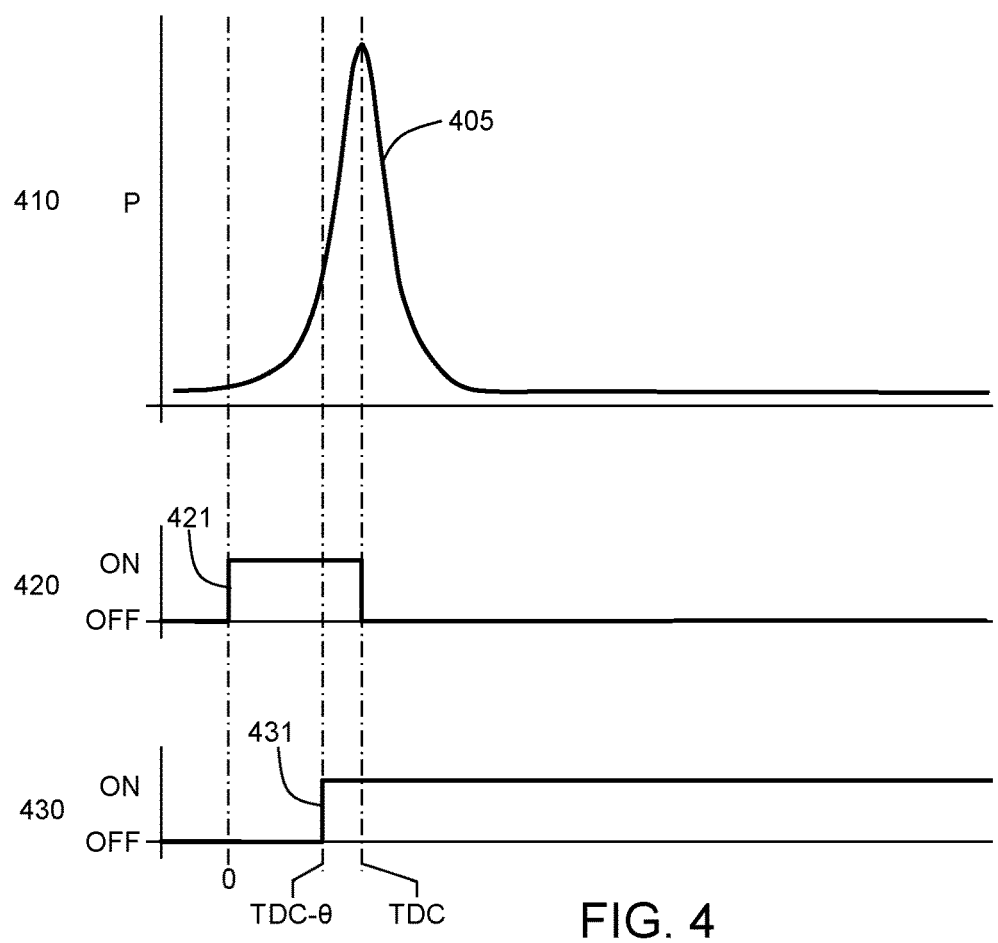
FIG. 4 illustrates an exemplary cylinder compression and corresponding electric machine commands, in accordance with one or more embodiments.

FIG. 4 illustrates an exemplary cylinder compression and corresponding SMU 111 and SGU 115 commands in charts 410, 420 and 430, respectively. Chart 410 illustrates in-cylinder pressure 405 of a single cylinder of the engine 102. Relative pressure "P" is illustrated along the vertical axis and engine crankshaft angle along the horizontal axis. In a multi-cylinder engine, chart 410 represents in-cylinder pressure for the first cylinder piston to undergo a compression stroke during an exemplary engine cranking cycle. Charts 420 and 430 share the same horizontal axis of engine crankshaft angle. Relative and absolute engine crankshaft angle information is known, for example, from rotation sensor 147 and/or rotation sensor 116 (FIG. 1). Chart 420 represents a SMU ON/OFF state command 421 for the SMU 111 during the exemplary engine cranking cycle. Similarly, chart 430 represents a SGU ON/OFF state command 431 for the SGU 115 during the exemplary engine cranking cycle. The SMU state command 421 and the SGU state command 431 are provided by the controller 145 as part of an overall engine cranking cycle control routine in accordance with a predetermined set of program instructions executed therein. Prior to an engine cranking cycle, the SMU state command 421 and the SGU state command 431 are both OFF. At the inception of an engine cranking cycle, for example in response to a user interface input, the SMU 111 receives the SMU ON state command 421 while the SGU state command 431 remains OFF. Thus, the SMU 111 is called upon to begin cranking the engine from a stopped engine state at a resting crankshaft angle. The SMU state command 421 remains ON for a predetermined amount of crankshaft rotation ending to at or about the top dead center compression stroke position (TDC) of the first engine cylinder piston undergoing a compression stroke. Since the absolute crankshaft position at the resting crankshaft angle is known, the amount of crankshaft rotation corresponding to at or about TDC position of the first engine cylinder piston undergoing a compression stroke is also known. TDC corresponds to the rotational position of the engine crankshaft requiring the largest cranking torque. At a predetermined advance angle "θ" preceding TDC, the SGU 115 receives the SGU ON state command 431 while the SMU state command 421 remains ON. Thus, the cranking torque applied to the crankshaft 103 while both the SMU state command 421 and the SGU state command 431 are ON is provided by the combined torques of the SMU 111 and the SGU 115 and coincides with the increasing torque demands of the compressing cylinder. At a subsequent predetermined crankshaft angle, the overlapping torque application by the SMU 111 and the SGU 115 may no longer be required and the SMU state command 421 may be switched to OFF while leaving the SGU state command ON. The switching of the SMU state command OFF may coincide at or about TDC position of the crankshaft 103 since after TDC the compressed gases within the cylinder work to impart torque to the crankshaft to assist the cranking torque from the SGU 115. Thus, it is appreciated that the overlapping of cranking torque from both the SMU 111 and the SGU 115 is temporal and configured only for peak crank torque demands coincident with cylinder compression, thereby reducing current demand from the battery 303 relative to continuously overlapping the SMU 111 and the SGU 115 torque contributions during an engine cranking cycle.

Figure 5:
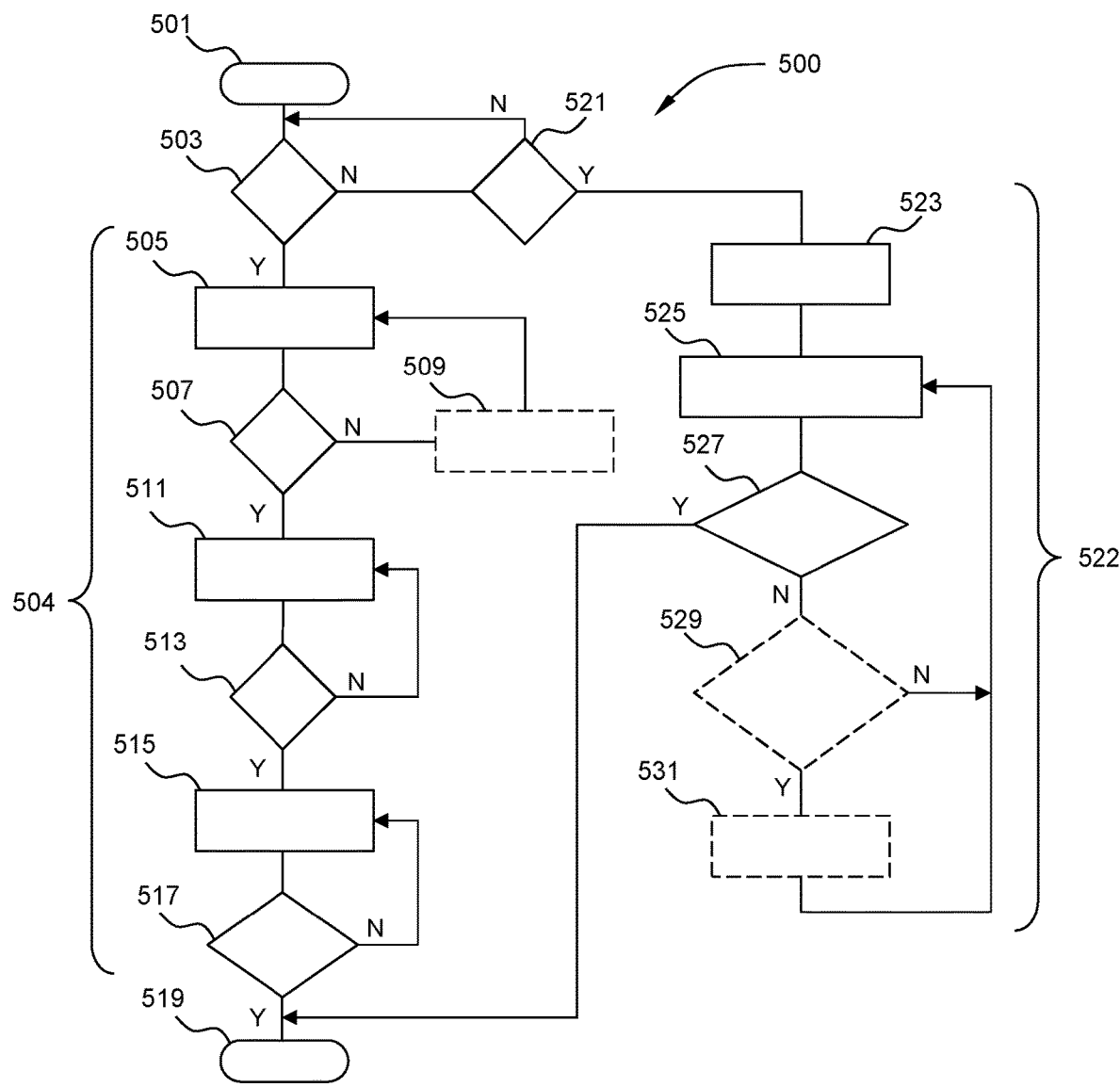
FIG. 5 is a process flow illustrating an exemplary implementation of an engine cranking method, in accordance with one or more embodiments.

FIG. 5 is a process flow 500 illustrating an exemplary implementation of an engine cranking method in accordance with the present disclosure. The process flow 500 may represent routines and functions executed or performed, at least in part, by a processor or processors disposed in the vehicle 10 of FIG. 1, including within the controller 145, and acting on or in conjunction with the various tangible hardware and devices including the internal combustion engine system 101 described herein. The process flow 500 is discussed in conjunction with the internal combustion engine system 101 of the exemplary vehicle 10 of FIG. 1 and the exemplary electrical system 301 of the exemplary vehicle 10 of FIG. 3 for illustration purposes. Further, the process flow 500 may be discussed and understood in conjunction with the various exemplary charts of FIGS. 2 and 4. It is noted that aspects of the process flow 500 may be performed by any suitable processing device or system, and various aspects may be implemented in whole or in part by circuits and controllers integrated with SMU 111 and SGU 115.

The process flow 500 begins at start block 501. Blocks 503 and 521 together determine whether engine start or stop routines are to be performed. For example, block 503 determines whether an engine start routine is to be performed. When block 503 determines an engine start is to be performed, then the engine start routine 504 (blocks 505-517) is performed. When block 503 determines an engine start is not to be performed, then block 521 determines whether an engine stop routine is to be performed. When block 521 determines an engine stop is to be performed, then the stop routine 522 (blocks 523-531) is performed. When block 521 determines an engine stop is not to be performed, then block 521 returns to block 503 whereat the process to determine whether engine start or stop routines are to be performed continues. Engine starting may be determined affirmatively based on various inputs and criteria including the current engine state being off, user request for an engine start, system requests for an engine start, and combinations thereof. Similarly, engine stopping may be determined affirmatively based on various inputs and criteria including the current engine state being on, user request for an engine stop, system requests for an engine stop, and combinations thereof. Thus engine starts and stops may be directly invoked by a user, for example through an ignition switch, push button or remote request by key fob, mobile device or remote service center. Engine starts and stops may be indirectly invoked by a user, for example while operating the vehicle in a start/stop mode wherein the engine may be stopped or started while the vehicle is idle in traffic (e.g., at a traffic signal) based in part upon the user controlled brake pedal application state. Engine starts and stops may be requested by vehicle controls, for example while the vehicle is idle in traffic (e.g., at a traffic signal) for long periods of time and engine starts and stops may be invoked as various considerations (e.g., fuel consumption, battery depletion, cabin climate control) are arbitrated by vehicle controls.

When an engine start is indicated at block 503, the engine start routine 504 (blocks 505-517) for the current engine cranking cycle is performed beginning at block 505 whereat the engine is cranked using only the SMU 111. This may be accomplished by providing the SMU 111 with the SMU ON state command 421 (FIG. 4). SMU 111 may be configured in various manners including with a controlled pull-in solenoid responsive to the SMU ON state command 421 to engage the pinion gear 113 to the ring gear 109 of the engine 102 and at the end of travel to close high current contacts to energize the SMU motor. Alternatively, the pinion gear 113 engagement to the ring gear 109 may be controlled separately from the SMU motor energization. Thus, as will be described more fully with respect to the stop routine 522 (blocks 523-531), the pinion gear 113 may already be engaged with the ring gear 109 through separate controls, wherein the SMU ON state command 421 effects energization of the SMU motor to rotate the already engaged pinion gear 113 and rotate the flywheel 105 and crankshaft 103. The crankshaft angle of the crankshaft 103 is monitored, for example via the crankshaft rotation sensor 147 or SGU rotation sensor 116, and block 507 determines whether the crankshaft position is within a predetermined advance angle "θ" preceding TDC (TDC-θ). In one embodiment, TDC-θ is the crankshaft angle at or about where the first cylinder piston of the engine 102 to undergo its compression stroke begins its compression stroke. Thus, the advance angle "θ" may represent a crankshaft angle up to about 180 degrees in advance of TDC or an absolute crankshaft angle at or about bottom dead center intake stroke position (BDC). Until the crankshaft position is within the predetermined advance angle "θ" preceding TDC (TDC-θ), the routine returns to block 505 and cranking continues with the SMU 111 only. Additionally, in embodiments where the SGU 115 includes a field coil, pre-fluxing of the field coil may be performed while the SMU is cranking as shown at block 509. When the crankshaft position reaches the predetermined advance angle "θ" preceding TDC (TDC-θ), the engine is cranked using both the SMU 111 and the SGU 115 as shown at block 511. This may be accomplished by providing the SGU 115 with the SGU ON state command 431 (FIG. 4). The SGU 115 may respond to the SGU ON state command 431 to control the SGU in a motoring mode and provide a cranking torque to the crankshaft 103 through the belt 119 and pulley 117, 107 arrangement. The crankshaft angle of the crankshaft 103 is monitored, for example via the crankshaft rotation sensor 147 or SGU rotation sensor 116, and block 513 determines whether the crankshaft position has reached TDC. Until the crankshaft position reaches TDC, the routine returns to block 511 and cranking continues with both the SMU 111 and the SGU 115. When the crankshaft position reaches TDC, the engine is cranked using only the SGU 115 as shown at block 515. The current engine cranking cycle is continued with the SGU 115 only, and block 517 determines whether the current engine cranking cycle should be ended.

Until the current engine cranking cycle is over, the routine returns to block 515 and cranking continues with only the SGU 115. When the current engine cranking cycle is over, the engine start routine 504 ends at block 519. An end to the current engine start routine may return to block 501 to begin the process flow again whereat blocks 503 and 521 together determine whether engine start or stop routines are to be performed. Block 517 may determine an end to the current engine start routine based on a plurality of considerations including, for example, the engine achieving stable combustion, crank time, predetermined crankshaft rotations, and low battery voltage, among others. It is noted that while the present exemplary embodiment only provides simultaneous SMU 111 and SGU 115 cranking at the first compression stroke and thereafter during the current engine cranking cycle only with the SGU 115, alternate embodiments may provide simultaneous SMU 111 and SGU 115 cranking at one or more subsequent compression strokes in accordance with the particular engine application, electric machine design output or operational performance/degradation, in response to environmental and engine operating history (e.g., cold ambient temperatures and cold soak engine starts), low crankshaft speed limits, and other considerations which may benefit from such overlapped cranking efforts during compression strokes of the engine.

When an engine stop is indicated at block 521, the stop routine 522 (blocks 523-531) for the current engine coast down cycle is performed beginning at block 523 whereat a crankshaft angle target is set. The engine crankshaft angle target is the desired crankshaft angle to be achieved when the engine comes to rest in the stopped engine state. The crankshaft angle of the crankshaft 103 is monitored, for example via the crankshaft rotation sensor 147 or SGU rotation sensor 116, and block 525 schedules the coast down (e.g., fuel tapering/cutoff, spark control) and manages the coast down to the crankshaft angle target with the SGU 115. The crankshaft angle of the crankshaft 103 is monitored, and when crankshaft speed is zero (0) as determined at block 527, the current engine coast down cycle is over and the current stop routine 522 ends at block 519. Until the crankshaft speed is zero (0), the routine returns to block 525 and managed coast down continues. Additionally, in embodiments where the SMU 111 includes a pull-in solenoid separately controllable for engaging the pinion gear 113 to the ring gear 109 without also energizing the SMU motor, a soft engagement of the pinion gear 113 to the ring gear 109 may be accomplished as illustrated at blocks 529 and 531. Soft engagement of the pinion gear 113 may occur during engine coast down at crankshaft speeds above zero (0) and below a predetermined crankshaft speed target, for example 20 RPM. Therefore, when the crankshaft speed is not zero (0) and above the crankshaft speed target, block 529 continues managed coast down at block 525. However, when the crankshaft speed is not zero (0) and below the crankshaft speed target, block 529 allows for the soft engagement of the SMU 111 pinion gear 113, for example by block 531 issuing a pinion engagement command to the SMU 111 whereafter block 525 continues to manage engine coast down until zero (0) crankshaft speed is determined at block 527 and the current stop routine 522 ends at block 519. Such a soft engagement may be advantageous during stop/start operations and improve the operator's experience upon a subsequent engine start routine. An end to the current stop routine may return to block 501 to begin the process flow again whereat blocks 503 and 521 together determine whether engine start or stop routines are to be performed.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A cranking system for an internal combustion engine, comprising:
    a first electric machine rotatably coupled to a crankshaft of the engine;
    a second electric machine rotatably coupled to the crankshaft of the engine; and
    a controller executing an engine cranking cycle, comprising:
        causing the first electric machine to crank the engine beginning from a stopped engine state and ending at a crankshaft angle substantially corresponding to a top dead center combustion position of a first piston undergoing a first compression stroke; and
        causing the second electric machine to crank the engine beginning at a crankshaft angle subsequent to a bottom dead center intake position of the first piston undergoing the first compression stroke.

2. The cranking system of claim 1, wherein the first electric machine is selectively rotatably coupled to the crankshaft of the engine.

3. The cranking system of claim 1, wherein the first electric machine comprises a starter motor unit.

4. The cranking system of claim 1, wherein the second electric machine comprises a starter/generator unit.

5. The cranking system of claim 1, wherein the first electric machine is rotatably coupled to the crankshaft of the engine through a pinion gear of the first electric machine meshing with a ring gear coupled to a flywheel coupled to the crankshaft.

6. The cranking system of claim 1, wherein the second electric machine is rotatably coupled to the crankshaft of the engine through a belt drive arrangement comprising a first pulley coupled to the second electric machine, a second pulley coupled to the crankshaft, and a belt coupled between the first pulley and the second pulley.

7. The cranking system of claim 1, wherein the controller executing an engine cranking cycle further comprises causing the first electric machine to crank the engine beginning at a crankshaft angle during at least one subsequent compression stroke and ending at a crankshaft angle substantially corresponding to the end of the at least one subsequent compression stroke.

8. A cranking system, comprising:
an internal combustion engine including a crankshaft, a flywheel coupled to the crankshaft and a ring gear coupled to the flywheel at a perimeter thereof;
a starter motor unit including a pinion gear rotatably coupled to an electric motor, the pinion gear being controllably engageable to the ring gear and the electric motor being controllably energizable to cause rotation of the pinion gear;
a starter/generator unit rotatably coupled to the crankshaft; and
a controller:
causing the pinion gear to engage with the ring gear and energizing the electric motor to crank the engine beginning from a stopped engine state and ending at a crankshaft angle substantially corresponding to a top dead center combustion position of a first piston undergoing a compression stroke; and
causing the starter/generator unit to crank the engine beginning at a crankshaft angle subsequent to a bottom dead center intake position of the first piston undergoing the compression stroke.

9. The cranking system of claim 8, wherein causing the pinion gear to engage with the ring gear occurs while the engine is coasting down to the stopped engine state.

10. The cranking system of claim 9, wherein causing the pinion gear to engage with the ring gear occurs while the engine is below a predetermined crankshaft speed target.

11. The cranking system of claim 8, wherein the starter/generator unit comprises a field coil, and further comprising the controller causing pre-fluxing of the field coil while the electric motor is energized and prior to the starter/generator unit cranking the engine.

12. The cranking system of claim 8, further comprising a rotation sensor sensing rotation of the crankshaft, wherein the rotation sensor provides crankshaft angle information to the controller.

13. The cranking system of claim 8, further comprising a rotation sensor sensing rotation of the starter/generator unit which is synchronized to rotation of the crankshaft, wherein the rotation sensor provides crankshaft angle information to the controller.

14. The cranking system of claim 8, further comprising the controller causing the starter motor unit to crank the engine beginning at a crankshaft angle during at least one subsequent compression stroke and ending at a crankshaft angle substantially corresponding to the end of the at least one subsequent compression stroke.

15. A method of performing an engine cranking cycle, comprising:
cranking the engine with a starter motor during an initial cranking period beginning from a stopped engine state and ending at a crankshaft angle substantially corresponding to the end of a first compression stroke of a first piston to undergo a compression stroke; and
cranking the engine with a starter/generator beginning no later than at a crankshaft angle during the first compression stroke and continuing until the engine crank cycle ends.

16. The method of performing the engine cranking cycle of claim 15, wherein cranking the engine with the starter/generator begins from the stopped engine state.

17. The method of performing the engine cranking cycle of claim 15, wherein cranking the engine with the starter/generator begins during the first compression stroke.

18. The method of performing the engine cranking cycle of claim 15, further comprising cranking the engine with the starter motor beginning at a crankshaft angle during at least one subsequent compression stroke and ending at a crankshaft angle substantially corresponding to the end of the at least one subsequent compression stroke.

19. The method of performing the engine cranking cycle of claim 15, further comprising pre-fluxing a field coil of the starter/generator during the initial cranking period until cranking the engine with the starter/generator begins.

20. The method of performing the engine cranking cycle of claim 15, further comprising engaging a pinion gear of the starter motor to a ring gear of a flywheel coupled to the crankshaft while the engine is coasting down to the stopped engine state.

* * * * *